United States Patent
Yun et al.

(10) Patent No.: US 9,749,379 B2
(45) Date of Patent: Aug. 29, 2017

(54) APPARATUS AND METHOD FOR RECEIVING VIDEO SERVICE IN HYBRID NETWORK

(71) Applicant: Electronics and Telecommunications Research Institute, Daejeon (KR)

(72) Inventors: Joungil Yun, Daejeon (KR); Byungjun Bae, Daejeon (KR); Kyu Tae Yang, Daejeon (KR); Yun Jeong Song, Daejeon (KR); Hun Hee Lee, Daejeon (KR); Hyoungsoo Lim, Daejeon (KR); Namho Hur, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 241 days.

(21) Appl. No.: 14/526,902

(22) Filed: Oct. 29, 2014

(65) Prior Publication Data
US 2015/0120957 A1    Apr. 30, 2015

(30) Foreign Application Priority Data

Oct. 31, 2013  (KR) .................. 10-2013-0131548
Aug. 26, 2014  (KR) .................. 10-2014-0111772

(51) Int. Cl.
*H04L 29/06* (2006.01)
*H04N 21/438* (2011.01)
*H04N 21/462* (2011.01)
*H04N 21/6371* (2011.01)
*H04N 21/6377* (2011.01)

(52) U.S. Cl.
CPC .......... *H04L 65/60* (2013.01); *H04L 65/4076* (2013.01); *H04L 65/80* (2013.01); *H04N 21/4381* (2013.01); *H04N 21/4384* (2013.01); *H04N 21/4622* (2013.01); *H04N 21/6371* (2013.01); *H04N 21/6377* (2013.01)

(58) Field of Classification Search
USPC .................. 709/231, 202, 204, 234, 246
See application file for complete search history.

(56) References Cited

U.S. PATENT DOCUMENTS

2013/0148028 A1    6/2013 Hahm et al.

*Primary Examiner* — Lan-Dai T Truong
(74) *Attorney, Agent, or Firm* — William Park & Associates Ltd.

(57) ABSTRACT

A receiving terminal in a hybrid network receives a video stream through a broadcasting network. The receiving terminal receives a high speed video stream streamed at a high speed for a defined first period from a first time when switching from the broadcasting network to a communication network depending on a receiving state of the broadcasting network is determined, receives a live video stream streamed in a live form from any one time of the first period, and generates a continuous video stream using the video stream received through the broadcasting network, the high speed video stream, and the live video stream.

19 Claims, 5 Drawing Sheets

APPARATUS AND METHOD FOR RECEIVING VIDEO SERVICE IN HYBRID NETWORK

CROSS-REFERENCE TO RELATED APPLICATION

This application claims priority to and the benefit of Korean Patent Application No. 10-2013-0131548 and 10-2014-0111772 filed in the Korean Intellectual Property Office on Oct. 31, 2013 and Aug. 26, 2014, the entire contents of which are incorporated herein by reference.

BACKGROUND OF THE INVENTION (a) Field of the Invention

The present invention relates to an apparatus and a method for receiving a video service in a hybrid network, and more particularly, to an apparatus and a method for receiving a video service for continuously providing the video service through a communication network when a received state of a broadcasting network is poor.

(b) Description of the Related Art

A network in which a broadcasting network is combined with a communication network is referred to as a hybrid network, and a service provided through the hybrid network is referred to as a broadcasting communication convergence service. To configure the hybrid network, functions such as broadcasting reception of a terminal, bidirectional communication, stream synchronization and linking services between heterogeneous networks, and the like are required. Hybrid broadcasting for providing streaming services and various types of additional services to broadcasting services provided from a broadcasting network based on a convergence of a current broadcasting network and a communication network, an additional module for wireless communication linking, and methods for controlling the same have been researched.

As an example, a broadcasting apparatus such as a DMB receiving terminal is a mobile receiving device. However, like a broadcasting receiving failure while a user moves or a the case in which a user is out of a broadcasting range, when a receiving environment suddenly deteriorates, a phenomenon in which a broadcasting receiving rate remarkably deteriorates may frequently occur. In this case, it is difficult to normally reproduce a DMB broadcasting content. In this situation, a need exists for a technology required to provide video linking services which seamlessly provide DMV services using the hybrid network.

When the broadcasting network and the communication network each receive a video stream, the broadcasting network and the communication network may simply switch a network receiving the stream to provide services. However, it is difficult for the simple switching method to provide services seamlessly.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for receiving a video service in a hybrid network capable of seamlessly providing the video service through a communication network when a received state of a broadcasting network is poor.

An exemplary embodiment of the present invention provides a method for receiving a video service of a receiving terminal in a hybrid network. The method for receiving a video service includes: receiving a video stream through a broadcasting network; receiving a high speed video stream streamed at a higher speed than an original bit ratio speed for a defined first period from a first time when switching from the broadcasting network to a communication network is determined; receiving a live video stream streamed at the original bit ratio speed from any one time of the first period; generating a continuous video stream using a video stream received through the broadcasting network, the high speed video stream, and the live video stream; and decoding the continuous video stream.

The receiving of the live video stream may include receiving the live video stream from the any one time to a second time when re-switching from the communication network to the broadcasting network is determined.

The first period may be ended before the second time.

The method for receiving a video service may further include requesting a receiving stop of the live video stream at the second time.

Each of the video stream received through the broadcasting network, the high speed video stream, and the live video stream includes timestamp information, and the continuously generating the video stream may include generating the continuous video stream using each timestamp of the video stream, the high speed video stream, and the live video stream which are received through the broadcasting network.

The receiving of the high speed video stream may include receiving a video stream at a position earlier than a position of the video stream received through the broadcasting network at the first time.

The any one time may be the same as the first time or later than the first time.

The receiving of the video stream through the broadcasting network may include: receiving a packet stream corresponding to the video stream through the broadcasting network; and generating the video stream by performing packet decoding on the packet stream, and the receiving of the high speed video stream may include determining the first time based on the packet decoding result of the packet stream.

The receiving of the live video stream may include determining the receiving stop time of the live video stream based on the packet decoding result of the packet stream.

Yet another embodiment of the present invention provides an apparatus for receiving a video service of a receiving terminal in a hybrid network. The apparatus for receiving a video service includes a broadcasting receiving processor, a high speed streaming processor, a live streaming processor, a video stream selection controller, and a video stream decoder. The broadcasting receiving processor may receive a packet stream corresponding to a video stream through a broadcasting network. The high speed streaming processor may request and receive a packet stream corresponding to a high speed video stream streamed at a first bit ratio speed for a defined first period from a first time when switching from the broadcasting network to a communication network is determined. The live streaming processor may request and receive a packet stream corresponding to a live video stream streamed at a second bit ratio speed later than the first bit ratio speed from any one time of the first period to a second time when a re-switching from the communication network to the broadcasting network is determined. The video stream selection controller may generate a continuous video stream using the video stream received through a broadcasting network, the high speed video stream, and the live video stream. The video stream decoder may decode the continuous video stream.

The video stream selection controller may determine the first time and the second time and control the high speed streaming processor and the live streaming processor.

The apparatus for receiving a video service may further include a first packet decoder configured to generate the video stream by performing packet decoding on a packet stream corresponding to the video stream, wherein the video stream decoder may determine the first time and the second time based on the packet decoding result of the first packet decoder.

The apparatus for receiving a video service may further include a second packet decoder configured to generate the live video stream by performing packet decoding on a packet stream corresponding to the live video stream, and a third packet decoder configured to generate the high speed video stream by performing packet decoding on a packet stream corresponding to the high speed video stream.

The video stream decoder may determine the any one time as a time which is the same as the first time or later than the first time.

The high speed streaming processor may request streaming from a video stream at a position earlier than a position of the video stream received through the broadcasting network at the first time depending on a control of the video stream decoder.

The video stream decoder may request streaming from the video stream at a position of the video stream received through the broadcasting network at the any one time depending on the control of the stream selection controller.

Each of the video stream received through the broadcasting network, the high speed video stream, and the live video stream may include timestamp information, and the apparatus for receiving a video service may further include a stream time comparator configured to compare each timestamp of the video stream received through the broadcasting network, the high speed video stream, and the live video stream and transfer the compared result to the stream selection controller.

The live streaming processor may request a receiving stop of the live video stream at the second time.

The first period may be ended before the second time.

The apparatus for receiving a video service may further include first to third video stream buffers configured to buffer the video stream, the live video stream, and the high speed video stream, respectively.

DETAILED DESCRIPTION OF THE EMBODIMENTS

Figure 1:
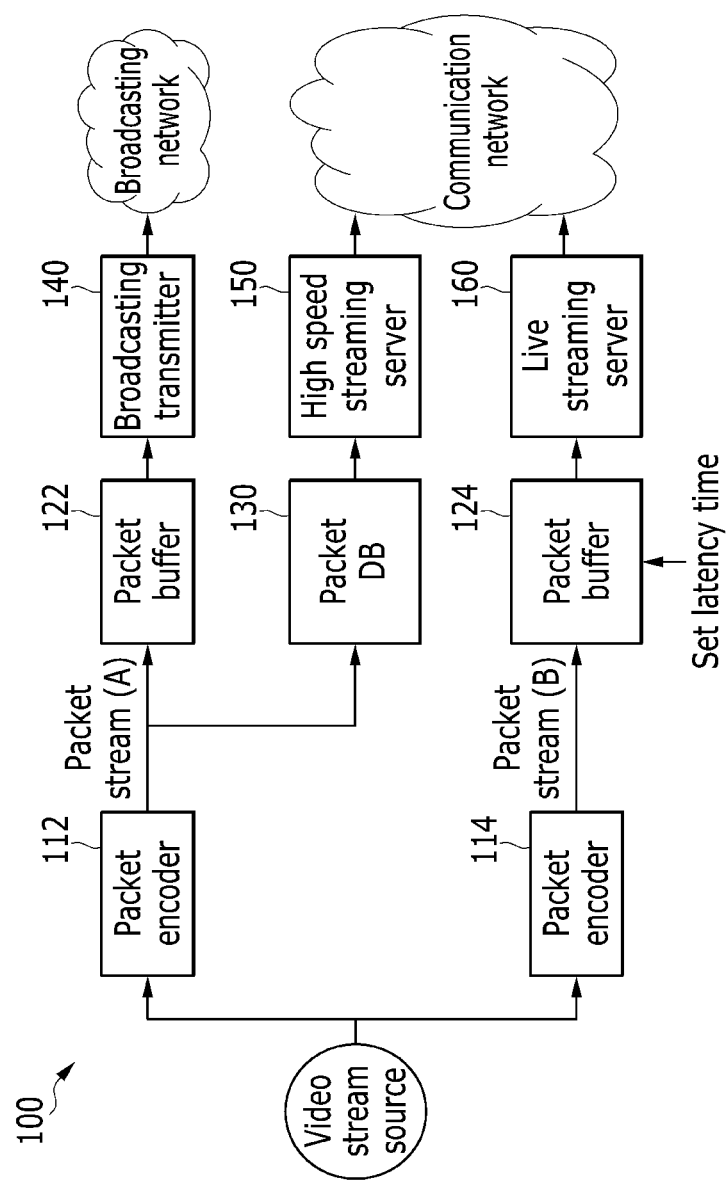
FIG. 1 is a diagram illustrating an apparatus for transmitting a video service in a hybrid network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and claims, unless explicitly described to the contrary, "comprising" any components will be understood to imply the inclusion of other elements rather than the exclusion of any other elements.

Hereinafter, an apparatus and a method for receiving a video service in a hybrid network according to an exemplary embodiment of the present invention will be described in detail with reference to the accompanying drawings.

FIG. 1 is a diagram illustrating an apparatus for transmitting a video service in a hybrid network according to an exemplary embodiment of the present invention.

Referring to FIG. 1, an apparatus 100 for transmitting a video service includes packet encoders 112 and 114, packet buffers 122 and 124, a packet DB 130, a broadcasting transmitter 140, a high speed streaming server 150, and a live streaming server 160.

The packet encoders 112 and 114 each encode a video stream source by a packet encoding scheme to generate packet streams A and B, respectively, and transfer the packet streams A and B to the packet buffers 122 and 124, respectively. Further, the packet encoder 112 transfers the packet stream A to the packet DB 130.

The packet encoding means packetizing the video stream source and multiplexing a packet. The video stream source includes compressed video and audio frames. That is, the video and audio frames are compressed by the video encoding and thus are input to the packet encoders 112 and 114.

The packet encoders 112 and 114 may use the same packet encoding scheme or may use different packet encoding schemes.

The packet buffers 122 and 124 buffer the packet streams A and B which are each input. More particularly, the packet buffer 124 provides a function of controlling a latency time of packet stream B depending on a buffering time of the packet buffer 122 to synchronize an output time of a stream provided through a broadcasting network with an output time of a stream provided in streaming of a communication network. Generally, when the video stream is provided through the broadcasting network, latency occurs due to characteristics of the broadcasting network. Therefore, a function of controlling a time difference between the stream transmitted to the broadcasting network and the stream provided by live streaming of the communication network is required, and the function of controlling the time difference is set in the packet buffer 124. That is, the packet buffer 124 sets a latency time corresponding to the buffering time of the packet buffer 122 and delays the packet stream B as much as the latency time and then outputs the packet stream B, thereby minimizing the difference between the output time of the stream transmitted to the broadcasting network and the output time of the stream provided by the live streaming of the communication network.

The packet DB 130 stores the input packet stream A. The packet DB 140 searches for packet streams corresponding to positions of packet streams individually requested by each receiving terminal connected to the high speed streaming server 150 and transfers the searched packet streams to the high speed streaming server 140.

The broadcasting transmitter 140 transmits the packet stream A buffered in the packet buffer 122 through the broadcasting network. The broadcasting transmitter 140 configures a transmission frame by the input packet stream A, and modulates the transmission frame into a broadcasting signal and transmits the modulated broadcasting signal through the broadcasting network. The transmission frame may be configured of a plurality of input packet streams A. The broadcasting transmitter 140 stuffs the packet stream A to be able to generate a packet stream of a fixed bit ratio. The broadcasting transmitter 140 may also perform outer encoding on the packet stream A to improve receiving performance of the video service.

When receiving a high speed streaming request from the receiving terminal, the high speed streaming server 150 is a server which encodes the packet stream A stored in the packet DB 130 with an IP streaming packet and streams the IP streaming packet at a higher speed than an original bit ratio speed of the packet stream A. The original bit ratio speed means a speed which may be reproduced at an original speed without overflow and underflow of the buffer at the time of reproduction.

The high speed streaming server 150 streams the IP streaming packet at a temporarily fast bit rate speed at the early stage of network switching to provide a continuous stream seamlessly at the time of network switching from the broadcasting network to the communication network. The high speed streaming server 150 individually processes the streaming requests of each receiving terminal and IP-streams the packet streams to each receiving terminals by a unicast scheme.

The high speed streaming server 150 may encode the corresponding packet stream with the IP streaming packet from the positions of the packet streams individually requested by each receiving terminal and stream the encoded packet stream. In addition to the method, the high speed streaming server 150 may use various streaming methods. However, the high speed streaming server 150 provides streaming at a highest speed at which the streaming may be stably received without an error depending on a situation of the communication network to which each receiving terminal is connected.

Generally, like a program clock reference (PCR) of an MPEG-2 transport stream (TS) as well as the video or audio frame, the packet stream also includes timestamp information. The timestamp information corresponds to a specific position of the packet stream. Therefore, as the position information of the packet streams individually requested by each receiving terminal, the timestamp information may be used.

Further, when the high speed streaming server 150 performs packet encoding on packet streams in a different form from the packet form used in the broadcasting network and transmits the packet streams, the position information of the packet streams requested from the high speed streaming server 150 by each receiving terminal may be used as a timestamp of the video or audio frame which is included in the packet stream, not the timestamp information of the packet stream. In this case, the packet DB 140 maps and stores the timestamp of the packet stream and the timestamp of the video or audio frame which is included in the packet stream so as to rapidly search for the position of the requested packet stream.

The live streaming server 160 is a server which encodes the packet stream B with the IP streaming packet and streaming-outputs the IP streaming packet at the original bit ratio speed of the packet stream B.

The live streaming server 160 receives the packet stream B to be output at the time of the stream request of the receiving terminal from the packet buffer 124 and performs the streaming output.

The live streaming server 160 may IP-stream the same stream to each receiving terminal by the unicast scheme, and may simultaneously IP-stream the same packet stream to the plurality of receiving terminals by a multicast or broadcast scheme.

Figure 2:
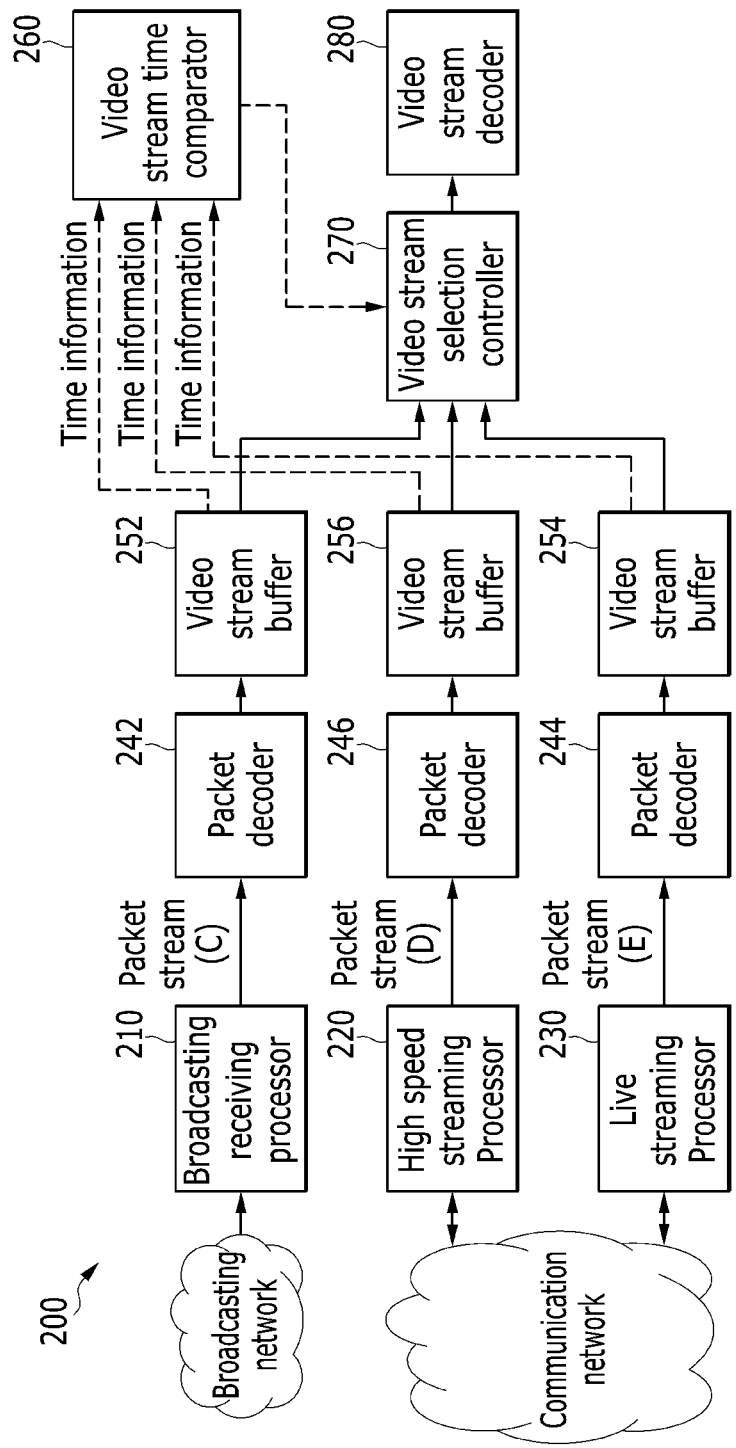
FIG. 2 is a diagram illustrating an apparatus for receiving a video service in a hybrid network according to an exemplary embodiment of the present invention.

FIG. 2 is a diagram illustrating an apparatus for receiving a video service in a hybrid network according to an exemplary embodiment of the present invention.

Referring to FIG. 2, an apparatus 200 for receiving a video service is a receiving terminal and includes a broadcasting receiving processor 210, a high speed streaming processor 220, a live streaming processor 230, packet decoders 242, 244, and 246, video stream buffers 252, 254, and 256, a video stream time comparator 260, a video stream selection controller 270, and a video stream decoder 280.

The broadcasting receiving processor 210 receives a broadcasting signal and outputs packet stream C from the broadcasting signal. The packet stream C of the broadcasting receiving processor 210 is the same stream as the packet stream A which is transmitted through the broadcasting network of FIG. 1.

The packet decoder 242 corresponds to the packet encoder 112 of FIG. 1, and decodes and outputs the packet stream C by a packet decoding scheme. An output of the packet decoder 242 is video frames and audio frames of the video stream source. Hereinafter, for convenience of explanation, the output of the packet decoder 242 is called a video stream.

The video stream buffer 252 buffers the video stream decoded by the packet decoder 24 to secure continuity guarantee time of the video stream and stably decode the video stream due to the latency of the communication network at the time of the network switching from the broadcasting network to the communication network.

The video stream buffer 252 may use a longer buffering time than that of the buffer for the general video stream decoding. However, the video stream buffer 252 may limit the buffering time to a limited range of about 1 to 2 seconds in consideration of the network switching time.

When the receiving state of the broadcasting network is poor and thus the network switching from the broadcasting network to the communication network is determined, the high speed streaming processor 220 is connected to the high speed streaming server 150 to request the video stream.

The high speed streaming processor 220 may request a video stream to receive the streaming at a high speed from the video stream at a position required to provide the continuous video service. The high speed streaming processor 220 may set the position of the requested video stream to provide the continuous video service at a position earlier than the position of the video stream received through the broadcasting network at the time of determining the network switching. By doing so, the video stream received through the broadcasting network and the video stream received through the communication network partially overlap each other.

The high speed streaming processor 220 receives the IP streaming packet transmitted at high speed streaming depending on the request and decodes the IP streaming packet with packet stream D and transmits the decoded IP streaming packet to the packet decoder 246.

Prior to the time when the network switching from the broadcasting network to the communication network is determined, a signal state of the broadcasting network is unstable and thus an error may partially occur in the received video stream. Therefore, when the high speed streaming processor 220 requests the streaming from the video stream at the position earlier than the position of the video stream received through the broadcasting network at the time of determining the network switching, the broadcasting video stream in which an error occurs is replaced by the video stream received in the IP streaming of the communication network, thereby securing the quality of the video service.

The packet decoder 246 decodes the packet stream D with the video stream and transmits the decoded packet stream D to the video stream buffer 256.

The video stream buffer 256 buffers the video stream decoded by the packet decoder 246.

The live streaming processor 230 may request the video stream after the stream request time of the high speed streaming processor 220. Further, the live streaming processor 230 may request the video stream at the same time as the stream request time of the high speed streaming processor 220 depending on the state of the communication network when a throughput of the communication network is sufficient. In this case, as the request of the live streaming processor 230 becomes late, the high speed streaming receiving time of the high speed streaming processor 220 may be relatively long.

The live streaming processor 230 receives the IP streaming packet transmitted by the live streaming and decodes the IP streaming packet with packet stream E, and transmits the decoded IP streaming packet to the packet decoder 244.

As described above, the packet stream B may be the same as the packet stream A or may be another form of packet stream. When the packet stream A and the packet stream B are the same packet stream, in the case in which the packet decoder 244 is the same as or different from the packet decoder 242, a packet decoder meeting the corresponding packet encoding standard may be used.

The packet decoder 244 decodes the packet stream E received through the communication network with the video stream and outputs the decoded packet stream E to the video stream buffer 254.

The video stream buffer 254 buffers the video stream decoded by the packet decoder 244.

The video and audio frames of the same video stream source are stored in the foregoing video stream buffers 252, 254, and 256, and the video stream buffers 252, 254, and 256 each transmit the time information of the buffered video streams, that is, the timestamp information, to the video stream time comparator 260.

The video stream time comparator 260 compares the timestamp of the video streams stored in each video stream buffer 252, 254, and 256 to transmit the video stream buffer information and the video streams required to provide the continuous service to the video stream selection controller 270.

The video stream selection controller 270 controls the output of the video stream buffers 252, 254, and 256 based on the buffer information and the video stream information transmitted from the video stream time comparator 260 to provide the continuous video stream to the video stream decoder 280.

The video stream decoder 280 decodes and outputs the continuous video stream.

The continuous video stream is received through the broadcasting network before the network switching from the broadcasting network to the communication network is determined. The video stream selection controller 270 may determine the network switching from the broadcasting network to the communication network based on the packet decoding result of the packet stream D received through the broadcasting network. That is, when the continuous frame is not configured due to the packet decoding error of the packet decoder 242, the video stream selection controller 270 may determine the network switching from the broadcasting network to the communication network. When the network switching from the broadcasting network to the communication network is determined, the video stream selection controller 270 controls the high speed streaming processor 220 and the live streaming processor 230 to request the receiving of streaming.

Further, after the network switching from the broadcasting network to the communication network is determined, the video stream selection controller 270 may determine a network switching from the communication network to the broadcasting network again based on the packet decoding result of the packet stream D received through the broadcasting network. When the network switching from the communication network to the broadcasting network again is determined, the video stream selection controller 270 controls the live streaming processor 230 to request stop of the receiving of the streaming.

The receiving of streaming of the high speed streaming processor 220 temporarily occurs at the time when the network switching is determined, and therefore the video stream selection controller 270 controls only the live streaming processor 230 when the network switching from the communication network to the broadcasting network is again determined.

When the streaming is received by the receiving terminal through the communication network, a latency time occurs due to an initial request/response process and a network latency. To compensate for the latency time, the high speed streaming server 150 of the apparatus 100 for transmitting a video service streaming-outputs the stream at a higher speed than an original bit ratio speed and the video stream decoder 280 decodes the video stream stored in the video stream buffer 252 before the video stream transmitted in the high speed streaming is received, thereby seamlessly providing the video service in view of a time or a scene.

As such, to prevent the temporal stop, the buffering time of the video stream buffer 252 needs to be set longer than the time until the high speed streaming is received from the high speed streaming request, and as the buffering time is long, the channel switching time is long. Therefore, the buffering time of the video stream buffer 252 may be appropriately set in consideration of the time until the high speed streaming is received from the high speed streaming request. In this case, since the continuous position is requested and received, the continuity of the scene may be secured at all times.

Figure 3:
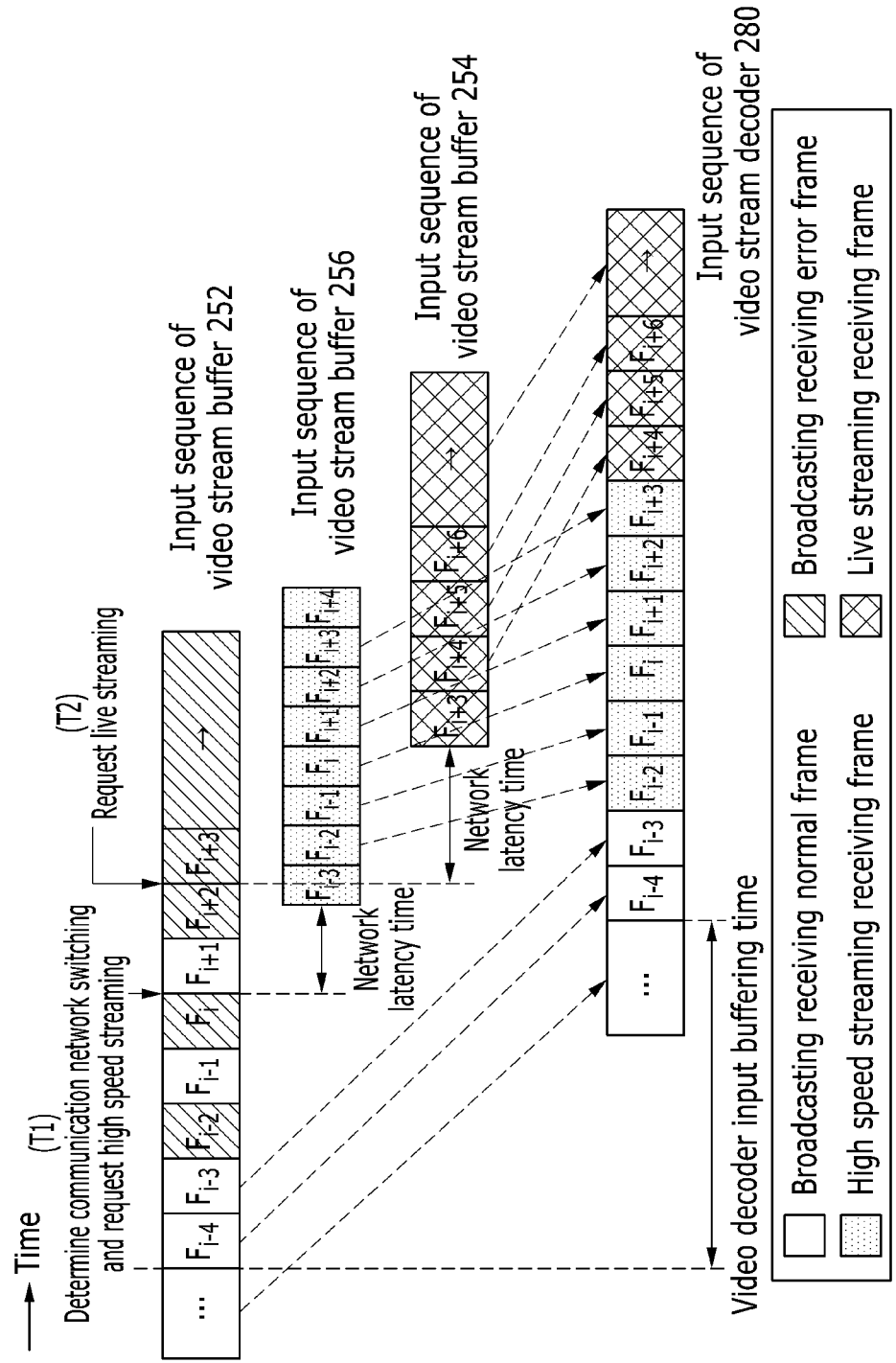
FIG. 3 is a diagram illustrating another example of continuously receiving video streams using a streaming method according to an exemplary embodiment of the present invention.

FIG. 3 is a diagram illustrating an example of receiving a continuous video stream using a streaming method according to an exemplary embodiment of the present invention.

Referring to FIG. 3, frames $F_{i-4}$, $F_{i-3}$, ..., $F_i$, $F_{i+1}$, ..., $F_{i+3}$, ... which are received through the broadcasting network are input to the video stream buffer 252.

It is assumed that the receiving state of the broadcasting signal is poor and thus an error occurs in frames $F_{i-2}$, $F_i$, $F_{i+2}$, and $F_{i+3}$ decoded by the packet decoder 242.

The video stream selection controller 270 confirms the continuity of the frames, which are normally packet-decoded, based on the packet decoding result of the packet decoder 242. The video stream selection controller 270 confirms that an error occurs in the frames $F_{i-2}$, $F_i$, $F_{i+2}$, $F_{i+3}$, and time T1 corresponding to the frame $F_i$ in which an error occurs may be determined as the network switching time from the broadcasting network to the communication network.

The high speed streaming processor 220 requests the high speed streaming from frame $F_{i-3}$ at a position of 3 frames earlier than a position of frame $F_i$ at time T1 according to the control of the video selection control unit 270. The streaming request position is determined based on the frame $F_{i-2}$ in which an error occurs and may be determined as a position of a frame earlier than the frame $F_{i-2}$ in which an error occurs.

The high speed streaming processor 220 starts the reception from the frame $F_{i-3}$ after the network latency time after a request, and buffers the received frames in the video stream buffer 256. The high speed streaming processor 220 may request the high speed streaming from the frame $F_{i-3}$ to frame $F_{i+4}$, and buffers the frames $F_{i-3}$-$F_{i+4}$ in the video stream buffer 256.

Next, the live streaming processor 230 may request the live streaming from the frame $F_{i+2}$ at time T2 corresponding to the frame $F_{i+2}$ after the time T1 according to the control of the video stream selection controller 270. The live streaming processor 230 starts the reception from the frame $F_{i+2}$ after the network latency time after the live streaming request, and buffers the received frames $F_{i+2}$, ... in the video stream buffer 254.

The streaming bit ratio speed of the high speed streaming server 150 is higher than that of the live streaming server 160, and thus the receiving time of each frame received from the high speed streaming server 150 is shorter than the receiving time of the frame received from the live streaming server 160 and the buffer input speed is also higher than that of the live streaming server 160.

Next, the video stream time comparator 260 compares the timestamp of the frame stored in each video stream buffer 252, 254, and 256 to transmit the buffer information and the frame information required to provide the continuous service to the video stream selection controller 270, and the video stream selection controller 270 selects a continuous frame sequence from each buffer and outputs the selected continuous frame sequence to the video stream decoder 280.

As such, a normal frame stored in the video stream buffer 252 is input to the video stream decoder 280 at the time T1 when the network switching is determined, and while the normal frame is reproduced in the video stream decoder 280, the frame in which an error occurs is rapidly received through the communication network and therefore the video stream decoder 280 may seamlessly provide the video service.

Figure 4:
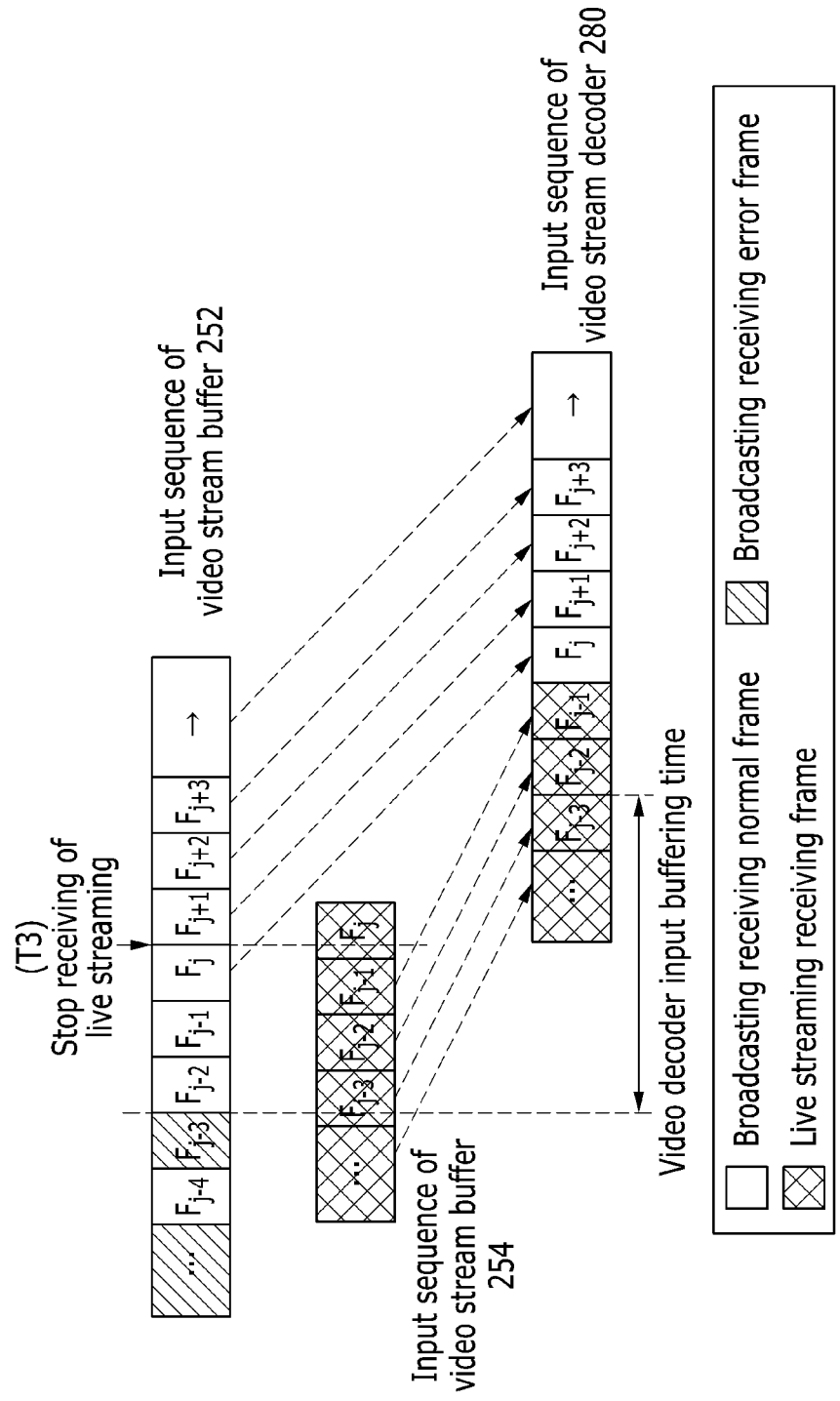
FIG. 4 is a diagram illustrating another example of continuously receiving video streams using a streaming method according to an exemplary embodiment of the present invention.

FIG. 4 is a diagram illustrating another example of continuously receiving video streams using a streaming method according to an exemplary embodiment of the present invention.

Referring to FIG. 4, after the network switching from the broadcasting network to the communication network, the video service is seamlessly provided in view of a time or a scene by the method as illustrated in FIG. 3.

When the receiving state of the broadcasting signal is good, the switching from the communication network to the broadcasting network again is determined. The video stream selection controller 270 may determine the switching from the communication network to the broadcasting network again based on the packet decoding result of the packet decoder 242 when an error does not continuously occur in a frame. For example, the video stream selection controller 270 may determine time T3 corresponding to frame $F_j$ as a time when the communication network is again switched to the broadcasting network when an error does not continuously occur from the frame $F_{j-2}$ of the video stream buffer 252.

The live streaming processor 230 requests the receiving stop of the live streaming at the time T3 according to the control of the video stream decoder 280. The live streaming processor 230 receives the frame $F_j$ in the live streaming according to the request of the receiving stop of the live streaming.

Then, the stream selection controller 270 selects the frame $F_j$ or the frame of the video stream buffer 252 after the frame $F_j$, and outputs the selected frame to the video stream decoder 280.

Figure 5:
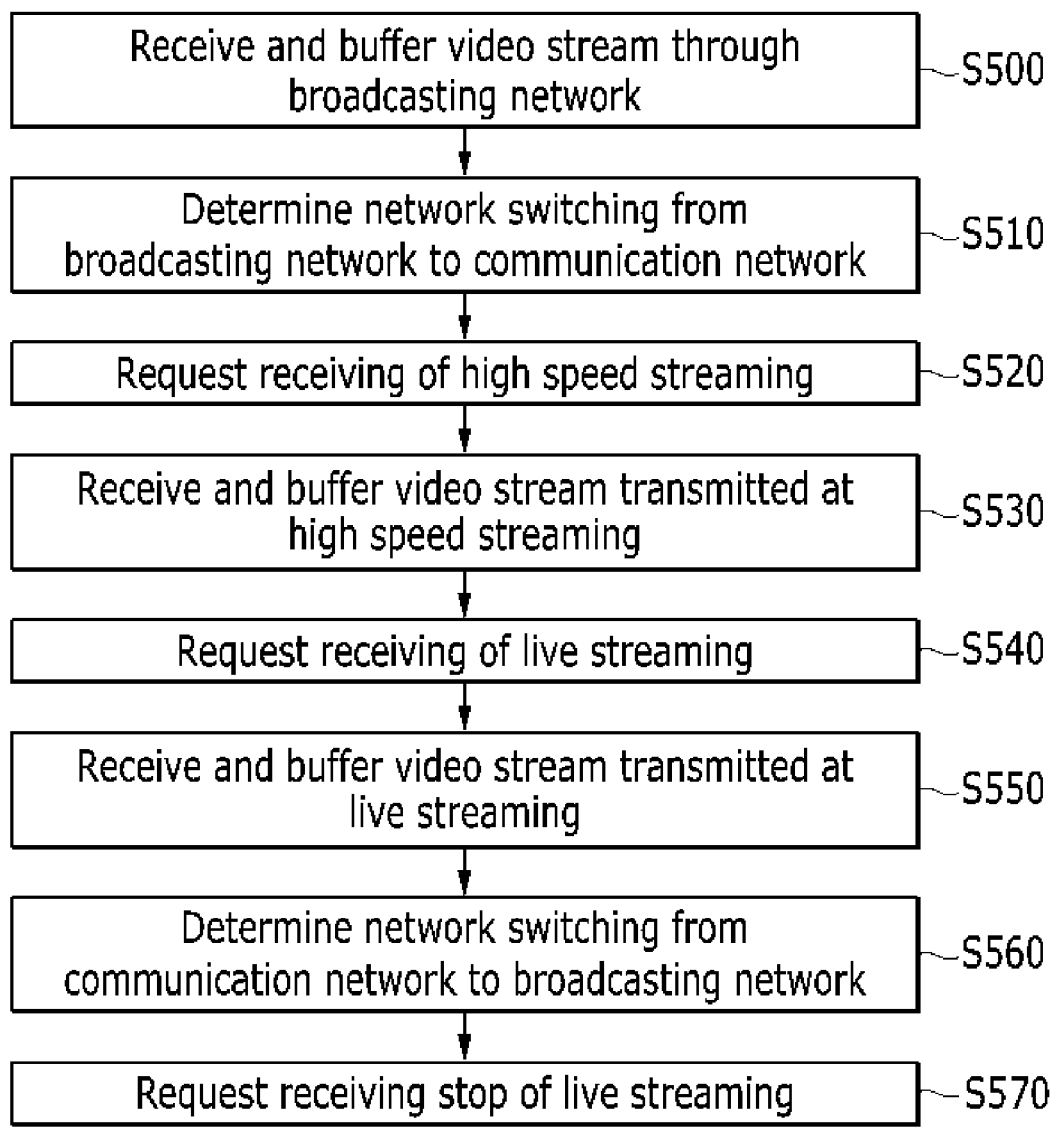
FIG. 5 is a flowchart illustrating a method for receiving a video service according to an exemplary embodiment of the present invention.

FIG. 5 is a flowchart illustrating a method for receiving a video service according to an exemplary embodiment of the present invention.

Referring to FIG. 5, the apparatus 200 for receiving a video service receives packet streams using the broadcasting signal through the broadcasting network, and packet-decodes the received packet streams and buffers the packet-decoded packet streams in the video stream buffer 252 (S500).

The apparatus 200 for receiving a video service decodes the video stream buffered in the video stream buffer 252 to provide the video service.

Meanwhile, when the receiving state of the broadcasting signal is poor and thus an error occurs at the time of the packet decoding, the apparatus 200 for receiving a video service determines the network switching from the broadcasting network to the communication network (S510).

The apparatus 200 for receiving a video service requests the apparatus 100 for transmitting a video service of the reception of the high speed streaming for the packet stream at a predetermined position at the time when the broadcasting network is switched to the communication network (S520).

The apparatus 200 for receiving a video service receives the packet stream at the corresponding position transmitted in the high speed streaming, and packet-decodes the received packet streams and buffers the packet-decoded packet streams in the video stream buffer 256 (S530). The apparatus 200 for receiving a video service may request the reception of the high speed streaming from the network switching time for a predetermined period.

Further, the apparatus 200 for receiving a video service requests the apparatus 100 to transmit a video service of the reception of the live streaming for the packet stream at a predetermined position at the time when the broadcasting network is switched to the communication network or the time after the network switching time (S540).

The apparatus 200 for receiving a video service receives the packet stream at the corresponding position transmitted in the high speed streaming, and packet-decodes the received packet streams and buffers the packet-decoded packet streams in the video stream buffer 254 (S550). The apparatus 200 for receiving a video service may request the reception of the live streaming until the network switching from the communication network to the broadcasting network is determined.

The apparatus 200 for receiving a video service compares the timestamp of the streams stored in each video stream buffer 252, 254, and 256 to generate temporally continuous video streams and decodes the video streams.

Meanwhile, the apparatus 200 for receiving a video service determines the network switching from the communication network to the broadcasting network when the receiving state of the broadcasting signal is good again (S560).

The apparatus 200 for receiving a video service requests the receiving stop of the live streaming when the network switching from the communication network to the broadcasting network is determined (S570). Thereafter, the continuous video stream is generated using the video stream buffered in the video stream buffer 252.

According to an exemplary embodiment of the present invention, the continuous stream may be provided by individually processing the requests of each receiving terminal using the unicast scheme in the temporary high speed streaming, but the same stream may be provided by the multicast or broadcast scheme as well as the unicast scheme in the live streaming, thereby continuously providing the video service at the time of the network switching while reducing the network load.

The exemplary embodiments of the present invention are not only implemented by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for receiving a video service by a receiving terminal in a hybrid network, comprising:
   processing computer executable program code embodied in computer readable storage media by one or more processors, the computer executable program code comprising:
   program code that receives video streams through a broadcasting network;
   program code that buffers the video streams in a first video stream buffer;
   program code that receives high speed video streams streamed at a higher speed than an original bit ratio speed for a defined first period from a first time when switching from the broadcasting network to a communication network is determined;
   program code that buffers the high speed video streams in a second video stream buffer;
   program code that receives live video streams streamed at the original bit ratio speed from any one time of the first period;
   program code that buffers the live video streams in a third video stream buffer;
   program code that generates a continuous video stream by comparing time stamps of the video streams stored in the first video stream buffer, the second video stream buffer, and third video stream buffer; and
   program code that decodes the continuous video stream.

2. The method of claim 1, wherein the program code that receives the live video stream includes program code that receives the live video stream from the any one time to a second time when switching from the communication network to the broadcasting network again is determined.

3. The method of claim 2, wherein the first period is ended before the second time.

4. The method of claim 2, further comprising program code that requests a receiving stop of the live video stream at the second time.

5. The method of claim 1, wherein the video stream received through the broadcasting network, the high speed video stream, and the live video stream each include information on the time stamp.

6. The method of claim 1, wherein the program code that receives the high speed video stream includes program code that receives a video stream at a position earlier than a position of the video stream received through the broadcasting network at the first time.

7. The method of claim 1, wherein the any one time is the same as the first time or later than the first time.

8. The method of claim 1, wherein the program code that receives the video stream through the broadcasting network includes:
   program code that receives a packet stream corresponding to the video stream through the broadcasting network; and
   program code that generates the video stream by performing packet decoding on the packet stream, and
   wherein the program code that receives the high speed video stream includes program code that determines the first time based on the packet decoding result of the packet stream.

9. The method of claim 8, wherein the program code that receives the live video stream includes program code that determines a receiving stop time of the live video stream based on the packet decoding result of the packet stream.

10. An apparatus for receiving a video service of a receiving terminal in a hybrid network, comprising:
    a broadcasting receiving processor having program code that receives packet streams corresponding to video streams through a broadcasting network;
    a first video stream buffer having program code that buffers the video streams in a first video stream buffer;
    a high speed streaming processor having program code that requests and receives packet streams corresponding to a high speed video streams streamed at a first bit ratio speed for a defined first period from a first time when switching from the broadcasting network to a communication network is determined;
    a second video stream buffer having program code that buffers the high speed video streams in a second video stream buffer;
    a live streaming processor having program code that requests and receives packet streams corresponding to live video streams streamed at a second bit ratio speed later than the first bit ratio speed from any one time of the first period to a second time when switching from the communication network to the broadcasting network again is determined;

a third video stream buffer having program code that buffers the live video streams in a third video stream buffer;

a stream time comparator having program code that compare time stamps of the video streams stored in the first video stream buffer, the second video stream buffer, and third video stream buffer;

a video stream selection controller having program code that generates a continuous video stream using the compared result of the stream time comparator; and a video stream decoder having program code that decodes the continuous video stream.

11. The apparatus of claim 10, wherein the video stream selection controller has program code that determines the first time and the second time and controls the high speed streaming processor and the live streaming processor.

12. The apparatus of claim 11, further comprising
a first packet decoder having program code that generates the video stream by performing packet decoding on the packet stream corresponding to the video stream, wherein the video stream decoder has program code that determines the first time and the second time based on the packet decoding result of the first packet decoder.

13. The apparatus of claim 12, further comprising:
a second packet decoder having program code that generates the live video stream by performing packet decoding on the packet stream corresponding to the live video stream; and a third packet decoder having program code that generates the high speed video stream by performing packet decoding on the packet stream corresponding to the high speed video stream.

14. The apparatus of claim 10, wherein the video stream decoder has program code that determines the any one time as a time which is the same as the first time or later than the first time.

15. The apparatus of claim 10, wherein the high speed streaming processor has program code that requests streaming from a video stream at a position earlier than a position of the video stream received through the broadcasting network at the first time depending on a control of the video stream decoder.

16. The apparatus of claim 10, wherein the video stream decoder has program code that requests streaming from the video stream at a position of the video stream received through the broadcasting network at the any one time depending on a control of the stream selection controller.

17. The apparatus of claim 10,
wherein each of the video stream received through the broadcasting network, the high speed video stream, and the live video stream includes timestamp information.

18. The apparatus of claim 10, wherein the live streaming processor has program code that requests a receiving stop of the live video stream at the second time.

19. The apparatus of claim 10, wherein the first period is shorter than a period from the any one time to the second time.

* * * * *